(12) United States Patent
Tas

(10) Patent No.: US 10,299,132 B2
(45) Date of Patent: *May 21, 2019

(54) WEB-BASED WIRELESS HOTSPOT CREATION AND MANAGEMENT

(71) Applicant: Google LLC, Mountain View, CA (US)

(72) Inventor: Nazif Cihan Tas, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,937

(22) Filed: Apr. 16, 2018

(65) Prior Publication Data

US 2018/0234851 A1    Aug. 16, 2018

Related U.S. Application Data

(63) Continuation of application No. 14/260,427, filed on Apr. 24, 2014, now Pat. No. 9,949,127.

(Continued)

(51) Int. Cl.
*H04W 12/08* (2009.01)
*H04L 29/08* (2006.01)
(Continued)

(52) U.S. Cl.
CPC ............ *H04W 12/08* (2013.01); *H04L 63/08* (2013.01); *H04L 63/104* (2013.01); *H04L 63/105* (2013.01); *H04L 67/02* (2013.01); *H04L 67/28* (2013.01); *H04L 67/303* (2013.01); *H04L 67/306* (2013.01); *H04W 12/10* (2013.01);

(Continued)

(58) Field of Classification Search
CPC ....... H04L 63/08; H04L 67/30; H04L 67/303; H04L 67/306; H04L 63/0823; H04L 63/104; H04L 63/105; H04L 67/02; H04L 67/28; H04W 12/04; H04W 12/06; H04W 12/08; H04W 48/02; H04W 48/08;
(Continued)

(56) References Cited

U.S. PATENT DOCUMENTS

6,738,901 B1 * 5/2004 Boyles ................ G06F 21/34
713/159
7,185,360 B1   2/2007 Anton, Jr. et al.
(Continued)

*Primary Examiner* — Gil H. Lee
(74) *Attorney, Agent, or Firm* — Lowenstein Sandler LLP (57) ABSTRACT

A computer implemented technique includes receiving, at a server, a request to utilize an intermediary device to establish a wireless hotspot for a mobile computing device to access a private computing network via a network device. The technique includes receiving, at the server, access information from a first user having control of the private computing network and the network device, the access information specifying users and their corresponding levels of access to the private computing network via the wireless hotspot. The technique includes receiving, at the server, identification information for a second user associated with the mobile computing device. The technique also includes transmitting, from the server and to the intermediary device, a level of access to the private computing network via the wireless hotspot causing the intermediary device to grant the mobile computing device the level of access to the private computing network via the network device.

14 Claims, 3 Drawing Sheets

Related U.S. Application Data (60) Provisional application No. 61/981,970, filed on Apr. 21, 2014.

(51) Int. Cl.
  *H04L 29/06* (2006.01)
  *H04W 12/10* (2009.01)
  *H04W 24/02* (2009.01)
  *G06Q 50/00* (2012.01)
  *H04W 48/08* (2009.01)
  *H04W 12/04* (2009.01)
  *H04W 88/08* (2009.01)
  *H04W 12/06* (2009.01)
  *H04W 48/02* (2009.01)

(52) U.S. Cl.
  CPC ............ *H04W 24/02* (2013.01); *G06Q 50/01* (2013.01); *H04L 63/0823* (2013.01); *H04L 67/30* (2013.01); *H04W 12/04* (2013.01); *H04W 12/06* (2013.01); *H04W 48/02* (2013.01); *H04W 48/08* (2013.01); *H04W 88/08* (2013.01)

(58) Field of Classification Search
  CPC ..... H04W 88/08; H04W 12/10; H04W 24/02; G06Q 50/01
  See application file for complete search history.

(56) References Cited

U.S. PATENT DOCUMENTS

| | | | |
|---|---|---|---|
| 7,774,455 | B1 | 8/2010 | Tock et al. |
| 8,041,815 | B2 | 10/2011 | Bahl et al. |
| 8,266,266 | B2 | 9/2012 | Short et al. |
| 8,484,309 | B2 | 7/2013 | Bong et al. |
| 2008/0039102 | A1* | 2/2008 | Sewall ................ H04L 12/2856 455/445 |
| 2009/0061764 | A1* | 3/2009 | Lockhart ........... G06F 17/30017 455/3.06 |
| 2012/0110640 | A1* | 5/2012 | Donelson .............. H04L 63/102 726/3 |
| 2012/0192258 | A1 | 7/2012 | Spencer et al. |
| 2013/0067081 | A1* | 3/2013 | Liu ....................... H04W 12/06 709/225 |
| 2013/0198274 | A1 | 8/2013 | Papakipos et al. |
| 2013/0198383 | A1* | 8/2013 | Tseng ................... H04L 63/102 709/225 |
| 2013/0347073 | A1 | 12/2013 | Bryksa et al. |
| 2014/0181172 | A1* | 6/2014 | Elliott .................. H04W 28/08 709/201 |
| 2014/0195654 | A1* | 7/2014 | Kiukkonen ............ H04W 8/00 709/220 |
| 2016/0048874 | A1* | 2/2016 | Brajer ................... G06Q 30/02 705/14.54 |

\* cited by examiner

WEB-BASED WIRELESS HOTSPOT CREATION AND MANAGEMENT

CROSS-REFERENCE TO RELATED APPLICATIONS

This application is a continuation of U.S. application Ser. No. 14/260,427, filed Apr. 24, 2014, which claims the benefit of U.S. Provisional Application No. 61/981,970, filed on Apr. 21, 2014, the disclosures of which are each incorporated herein by reference in their entireties.

FIELD

The present disclosure relates generally to private computing network access and, more particularly, to web-based wireless hotspot creation and management.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A private computing network is a means of connecting to the Internet. In a conventional private computing network, a network device (e.g., a router) can be configured to control access to the private computing network and a user device, e.g., a mobile computing device, can be configured to request access to the private computing network. Typically, a first user having control of the private computing network (e.g., an owner/administrator of the router) is required to give a second user of the user device a network key in order for the user device to access the private computing network. Examples of the network key include Wired Equivalent Privacy (WEP) keys and Wireless Protected Access (WPA) keys. The first user may not wish to give their network key to the second user, so they may be forced to create another network key for the second user. Either way, this process is time consuming, particularly when the network keys are complicated, e.g., multi-character WEP keys.

SUMMARY

A computer-implemented technique can include detecting, at a server having one or more processors, an intermediary device having access to a private computing network via a network device, the intermediary device being configured to establish a wireless hotspot for a mobile computing device. The technique can include receiving, at a server having one or more processors, a request via a social network website to utilize the intermediary device to establish the wireless hotspot for the mobile computing device to access the private computing network. The technique can include commanding, by the server, the intermediary device to establish the wireless hotspot in response to receiving the request. The technique can include receiving, at the server, access information via the social network website from a computing device associated with a first user having control of the private computing network and the network device, the access information specifying groups of user accounts at the social network website and their corresponding levels of access to the private computing network via the wireless hotspot. The technique can include receiving, at the server, identification information from the mobile computing device, the mobile computing device being associated with a second user, the identification information being indicative of a user account of the second user. The technique can also include transmitting, from the server and to the intermediary device, a level of access to the private computing network via the wireless hotspot, wherein the level of access is associated with one of the groups of user accounts at the social network website that includes the user account of the second user, wherein receiving the level of access causes the intermediary device to grant the mobile computing device the level of access to the private computing network via the network device.

Another computer-implemented technique is also presented. The technique can include receiving, at a server having one or more processors, a request to utilize an intermediary device to establish a wireless hotspot for a mobile computing device to access a private computing network via a network device, the intermediary device having access to the private computing network via the network device. The technique can include receiving, at the server, access information from a computing device associated with a first user having control of the private computing network and the network device, the access information specifying users and their corresponding levels of access to the private computing network via the wireless hotspot. The technique can include receiving, at the server, identification information from the mobile computing device, the mobile computing device being associated with a second user, the identification information indicative of an identity of the second user. The technique can also include transmitting, from the server and to the intermediary device, a level of access to the private computing network via the wireless hotspot, the level of access being associated with the second user, the level of access causing the intermediary device to grant the mobile computing device the level of access to the private computing network via the network device.

In some embodiments, the request is generated by the first computing device in response to input by the first user at a website displayed at the computing device.

In other embodiments, the access information specifies groups of user accounts associated with the website and their corresponding levels of access to the private computing network via the wireless hotspot.

In some embodiments, the identification information indicates a user account of the second user.

In other embodiments, the level of access associated with the second user is a particular level of access associated with a group of user accounts that includes the user account of the second user.

In some embodiments, the website is a social network website.

In other embodiments, the technique further comprises: detecting, at the server, the intermediary device, and commanding, by the server, the intermediary device to establish the wireless hotspot in response to receiving the request.

In some embodiments, the network device is a router configured with a network key for selectively granting access to the private computing network.

In other embodiments, the intermediary device is a wireless access point comprising a transceiver.

In some embodiments, the wireless access point is a wireless streaming-media device.

A server is also presented. The server can have one or more processors configured to perform operations including receiving a request to utilize an intermediary device to establish a wireless hotspot for a mobile computing device to access a private computing network via a network device, the intermediary device having access to the private computing network via the network device. The operations can include receiving access information from a computing device associated with a first user having control of the private computing network and the network device, the access information specifying users and their corresponding levels of access to the private computing network via the wireless hotspot. The operations can include receiving identification information from the mobile computing device, the mobile computing device being associated with a second user, the identification information indicative of an identity of the second user. The operations can also include transmitting, to the intermediary device, a level of access to the private computing network via the wireless hotspot, the level of access being associated with the second user, the level of access causing the intermediary device to grant the mobile computing device the level of access to the private computing network via the network device.

In some embodiments, the request is generated by the first computing device in response to input by the first user at a website displayed at the computing device.

In other embodiments, the access information specifies groups of user accounts associated with the website and their corresponding levels of access to the private computing network via the wireless hotspot.

In some embodiments, the identification information indicates a user account of the second user.

In other embodiments, the level of access associated with the second user is a particular level of access associated with a group of user accounts that includes the user account of the second user.

In some embodiments, the website is a social network website.

In other embodiments, the operations further comprise: detecting the intermediary device, and commanding the intermediary device to establish the wireless hotspot in response to receiving the request.

In some embodiments, the network device is a router configured with a network key for selectively granting access to the private computing network.

In other embodiments, the intermediary device is a wireless streaming-media device comprising a transceiver.

In some embodiments, the level of access is one of full/unrestricted access, restricted access, paid access, advertisement (ad-based) access, mature content filtered/unfiltered access, and no access.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, distributing and inputting a network key for a private computing network is time consuming for both the owner/administrator of the private computing network and a user attempting to gain access to the private computing network, and may also create potential security issues for the owner/administrator. Accordingly, techniques are presented for web-based wireless hotspot creation and management. These techniques can utilize an intermediary device to create a wireless hotspot and act as a proxy between the network device and a mobile computing device requesting access, thereby providing selective access to the private computing network to the mobile computing device. In some implementations, the techniques can be implemented by a server and the wireless hotspot can be managed by the owner/administrator via a social network website associated with the server. The social network website can be particularly useful as a management portal because the social network website is likely already associated with user accounts of a majority of the owner/administrator's friends, family, and the like.

Figure 1:
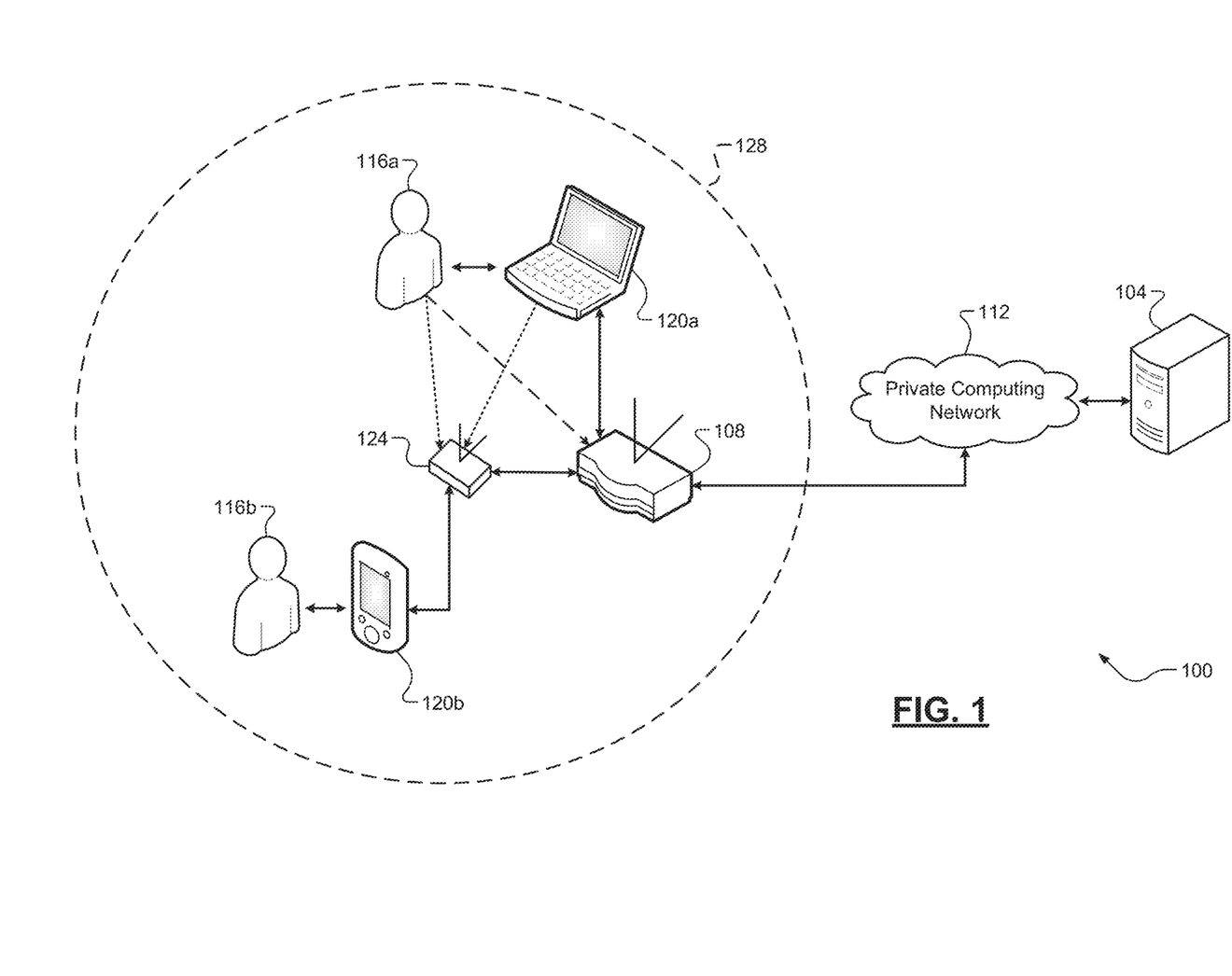
FIG. 1 is diagram of a computing network including an example server according to some implementations of the present disclosure.

Referring now to FIG. 1, a diagram of a computing network 100 and its associated components is illustrated. The computing network 100 can include an example server 104 according to some implementations of the present disclosure. A network device 108 can communicate with the server 104 via a private computing network 112. The term "private computing network" as used herein refers to a computing network that requires a network key or other suitable authentication in order to utilize the computing network. The network device 108 can control access to the private computing network 112. An example of the network device 108 is a router, but it should be appreciated that any suitable gateway device can be utilized. The private computing network 112 can include a local area network (LAN), a wide area network (WAN), e.g., the Internet, or a combination thereof. It will also be appreciated that the private computing network 112 can be a LAN that acts as a bridge to a public WAN, e.g., the Internet.

The network device 108 can be owned and controlled by a first user 116a. The first user 116a can also be referred to as an owner or administrator of the network device 108 and/or the private computing network 112. For example, the network device 108 may be a router located in a home of the first user 116a. The first user 116a can access the network device 108 via a computing device 120a. While a laptop computing device is illustrated, it should be appreciated that any suitable computing device can be utilized to access the network device 108 (a desktop computer, a tablet computer, a mobile phone, etc.). For example, the first user 116a can access the network device 108 to set a network key. The term "network key" as used herein refers to a key or a password required for accessing the private computing network 112 via the network device 108. Examples of the network key include Wired Equivalent Privacy (WEP) keys and Wireless Protected Access (WPA) keys.

The computing network 100 can also include an intermediary device 124. The intermediary device 124 can be any suitable device having access to the private computing network 112 via the network device 108 and configured to wirelessly transmit/receive information from other devices, e.g., using a transceiver. The intermediary device 124 can also be referred to as a wireless access point (WAP). The intermediary device 124 can be a wireless media-streaming device, for example only, a wireless media-streaming device associated with a television, a stereo system, or another computing device. It should be appreciated, however, that the intermediary device 124 could also be wired to the network device 108.

The computing network 100 can also include a mobile computing device 120*b* associated with a second user 116*b*. While a mobile phone is illustrated, it should be appreciated that the mobile computing device 120*b* can be any suitable mobile computing device (a laptop computer, a tablet computer, etc.). For example, the second user 116*b* may be a friend or colleague of the first user 116 that wishes to access the private computing network 112 with their mobile computing device 120*b*. Instead of providing the network key for the network device 108 to the second user 116*b*, the first user 116*a* can create and manage a wireless hotspot 128 with the intermediary device 124 and via the server 104 according to the techniques of the present disclosure, which are described in greater detail below.

Figure 2:
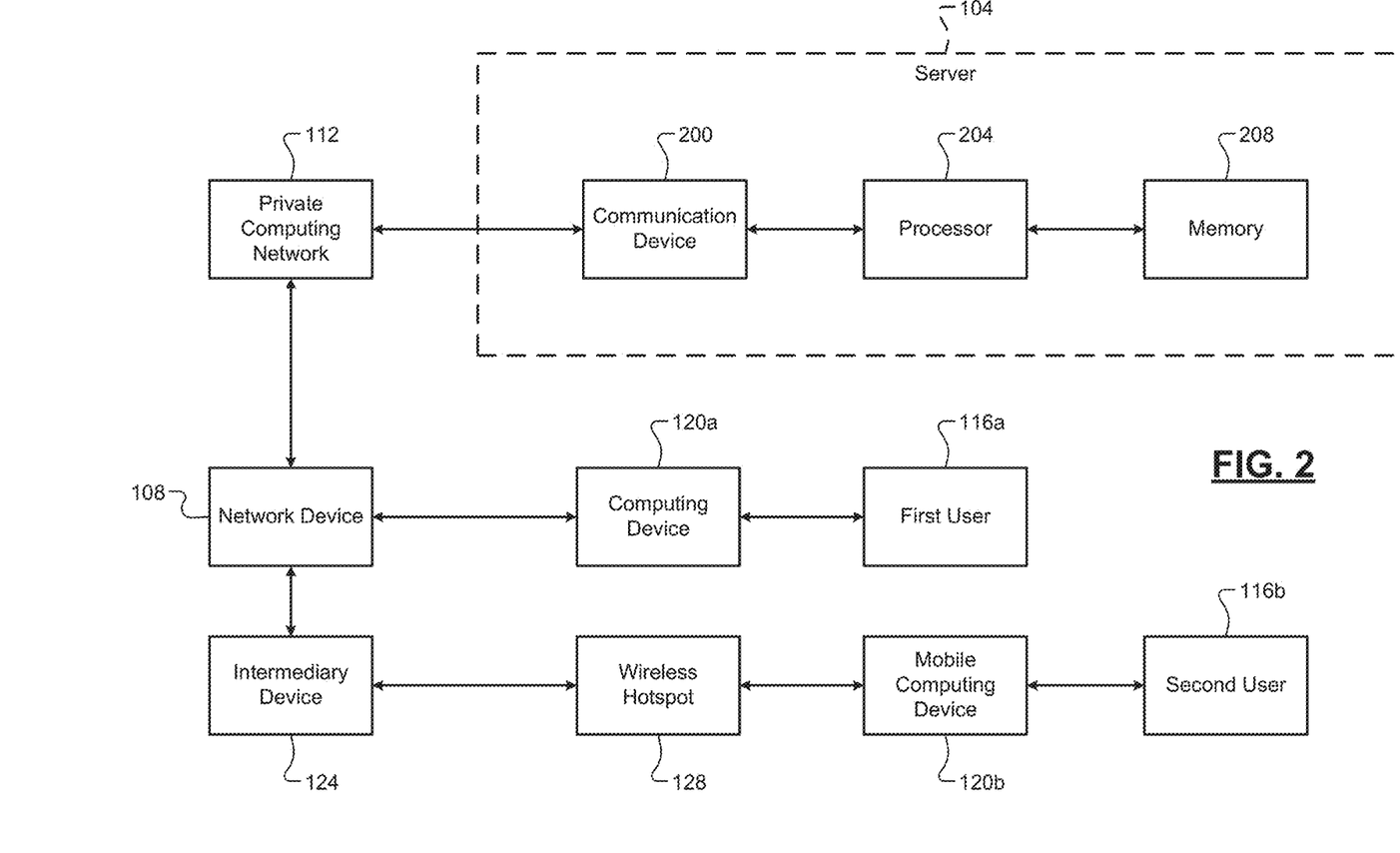
FIG. 2 is a functional block diagram of the example server of FIG. 1.

Referring now to FIG. 2, a functional block diagram of the example server 104 is illustrated. The server 104 can be configured to execute at least a portion of the techniques of the present disclosure. In some implementations, the server 104 can also host the social network website, but it should be appreciated that another suitable server in communication with the server 104 may host the social network website. The server 104 can include a communication device 200, a processor 204, and a memory 208. The communication device 200 can include any suitable components, e.g., a transceiver, configured for communication between the processor 204 and other devices via the private computing network 112. The memory 208 can be any suitable storage medium (flash, hard disk, etc.) configured to store information at the server 104.

The processor 204 can control operation of the server 104. This can include performing operations including, but not limited to, loading/executing an operating system of the server 104, controlling transmission by and processing information received via the communication device 200, and controlling read/write operations at the memory 208. The term "processor" as used herein can refer to both a single processor and two or more processors operating in a parallel or distributed architecture. Similarly, the term "server" as used herein can refer to both a single server and two or more servers operating in a parallel or distributed architecture. The processor 204 can be further configured to perform at least a portion of the techniques of the present disclosure, which are described in greater detail below.

As previously mentioned, the intermediary device 124 can be configured to establish the wireless hotspot 128 for selective access to the private computing network 112 via the network device 108. In this regard, the intermediary device 124 can also be described as acting as a proxy between the network device 108 and computing devices seeking access to the private computing network 112, such as the mobile computing device 120*b*. In some implementations, wireless hotspot settings for the intermediary device 124 can be configured while initially setting up and configuring the intermediary device 124 for its other uses, e.g., media-streaming. For example, the intermediary device 124 may be associated with a user account of the first user 116*a*, such as a user account at the social network website. The website could alternatively be another website associated with user accounts, such as an e-mail website. Alternatively, these wireless hotspot settings could be configured after the intermediary device 124 has already been set up and configured for its other uses. Examples of these wireless hotspot settings are discussed in greater detail below.

The processor 204 can initially receive a request to utilize the intermediary device 124 to establish the wireless hotspot 128 for the mobile computing device 120*b* to access the private computing network 112 via the network device 108. This request can be generated in response to input by the first user 116*a* at the social network website, which can be displayed at their computing device 120*a*. Before the wireless hotspot 128 can be established, however, the processor 204 may first detect the intermediary device 124. For example, the processor 204 may ping the intermediary device 124 via the communication device 200. This process may also include the processor 204 determining whether the intermediary device 124 has been configured for establishing the wireless hotspot 128, such as having the wireless hotspot settings. The wireless hotspot settings can be stored at the server 104, e.g., at the memory 208.

When the intermediary device 124 is detected, the processor 204 can command the intermediary device 124 to establish the wireless hotspot 128. The intermediary device 124 can establish the wireless hotspot 128 in response to receiving the command by broadcasting a signal identifying the wireless hotspot 128 and that is detectable by other computing devices in range, including the mobile computing device 120*b*. The broadcasted signal can be detected by the mobile computing device 120*b*, and the second user 116*b* can select the wireless hotspot 128 at the mobile computing device 120*b* thereby generating a request to join/access the wireless hotspot 128. The intermediary device 124 can then act as the proxy between the mobile computing device 120*b* and the network device 108 such that the mobile computing device 120*b* and the server 104 can communicate via the private computing network 112 to establish a level of access for the mobile computing device 120*b* to the private computing network 112.

The mobile computing device 120*b* can be prompted to provide identification information for the second user 116*b*. For example, the identification information may be login information for a user account of the second user 116*b* at the social network website. This identification information can be utilized by the server 104 to determine the level of access for the mobile computing device 120*b* to the private computing network 112. The levels of access are part of the previously discussed wireless hotspot settings. Examples of the level of access include full/unrestricted access, restricted access, paid access, advertisement (ad-based) access, mature content filtered/unfiltered access, and no access. Paid access can require the second user 116*b* to provide a payment account, such as a virtual wallet, to be used to pay for their access. Ad-based access can include displaying advertisements at each website and/or application utilized. The first user 116*a* can configure each of these levels of access when configuring the wireless hotspot settings.

Each level of access can be assigned to specific users thereby creating groups of user accounts at the social network website that are associated with each level of access. Each user account at the social network website can be associated with a user. These groups of user accounts can be configured by the first user 116*a* at and stored at the social network website. The information specifying the levels of access and the respective groups of user accounts can also be referred to as access information. In some implementations, the first user 116*a* could create new groups and/or utilize existing groups of user accounts (family, friends, acquaintances, etc.) to assign to the various levels of access.

Utilizing these groups of user accounts, the processor 204 can determine to which group the user account for the second user 116b (specified by the provided identification information) belongs. When the user account for the second user 116b is not in any of the groups of user accounts, the processor 204 may default to associating the second user 116b with no access.

The processor 204 can then provide the level of access corresponding to the user account of the second user 116b to the intermediary device 124 via the private computing network 112 and the network device 108. Receiving the level of access can cause the intermediary device 124 to act as a proxy between the network device 108 and the mobile computing device 120b, and thus effectively grant the specified level of access to the mobile computing device 120b. If the first user 116a decides to change the level of access for the second user 116b, he/she can move the user account of the second user 116b to a different group of user accounts via the social network website. In this manner, access to the private computing network 112 can be easily controlled without having to change specific network settings at the network device 108. Additionally, some of the levels of access provide an opportunity for revenue generation for the first user 116a (paid access) and/or other parties (ad-based access, via click-throughs).

Figure 3:
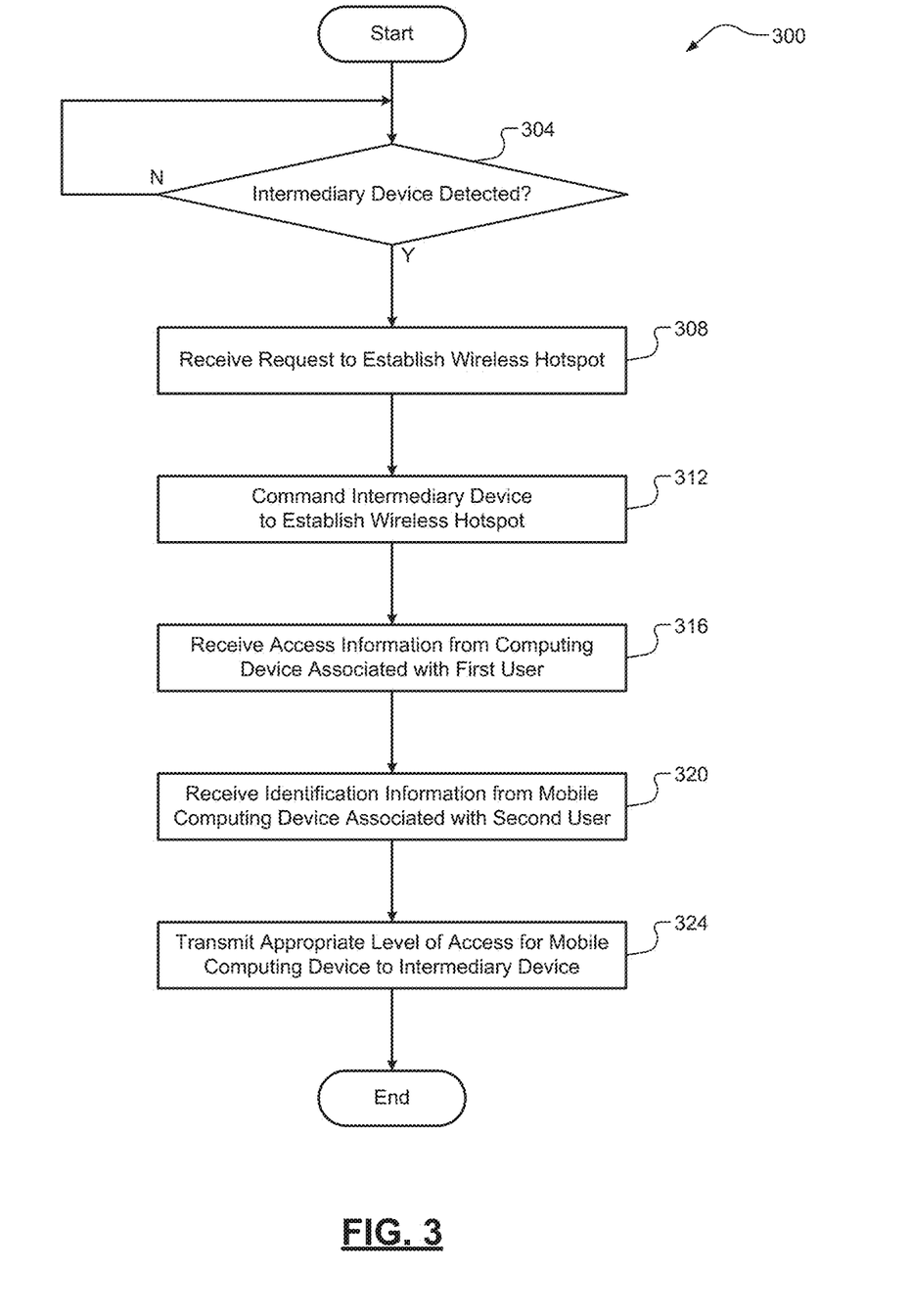
FIG. 3 is a flow diagram of an example technique for wireless hotspot creation and management according to some implementations of the present disclosure.

Referring now to FIG. 3, an example flow diagram of a technique 300 for wireless hotspot creation and management is illustrated. At 304, the server 104 can detect the intermediary device 124. When the intermediary device 124 is not detected, the technique 300 can end or return to 304. When the intermediary device 124 is detected, the server 104 can receive a request via the social network website at 308 to utilize the intermediary device 124 to establish the wireless hotspot 128 for the mobile computing device 120b to access the private computing network 112.

At 312, the server 104 can command the intermediary device 124 to establish the wireless hotspot 128 in response to receiving the request. At 316, the server 104 can receive access information via the social network website from the computing device 120a associated with the first user 116a, the access information specifying groups of user accounts at the social network website and their corresponding levels of access to the private computing network 112 via the wireless hotspot 128. At 320, the server 104 can receive identification information from the mobile computing device 120b that is indicative of a user account of the second user 116b.

At 324, the server 104 can transmit a level of access to the private computing network 112 via the wireless hotspot 128 to the intermediary device 124, the level of access being associated with one of the groups of user accounts at the social network website that includes a user account of the second user 116b. Receiving the level of access can cause the intermediary device 124 to grant the mobile computing device 120b the level of access to the private computing network 112 via the network device 108. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:

receiving, at a server, a request via a social network website to utilize an intermediary device to establish a wireless hotspot for access to a private computing network, wherein the intermediary device has access to the private computing network via a network device and is associated with a user account of a first user at the social network website and wherein the server is connected to the intermediary device via the private computing network and hosts the social network website;

transmitting, by the server, a command to the intermediary device via the private computing network to establish the wireless hotspot in response to receiving the request via the social network website;

receiving, at the server, access information associated with the user account of the first user via the social network website from a computing device associated with the first user, the access information specifying groups of user accounts associated with the social network website and their corresponding levels of access to the private computing network via the wireless hotspot;

receiving, at the server, identification information via the social network website from a mobile computing device of a second user, the identification information being indicative of a user account of the second user;

determining, at the server, a level of access to the private computing network via the wireless hotspot for the mobile computing device of the second user based on a particular group to which the user account of the second user belongs, wherein the particular group is one of the groups specified in the access information and wherein the level of access for the mobile computing device of the second user is to be changed in view of associating, based on input received via the social network website, the user account of the second user with a different group of user accounts specified in the access information; and transmitting, from the server and to the intermediary device, the determined level of access to the private computing network via the wireless hotspot to cause the intermediary device to act as a proxy between the mobile computing device and the network device and grant the mobile computing device the level of access to the private computing network via the wireless hotspot.

2. A non-transitory computer-readable medium comprising instructions, which when executed by a processor, cause the processor to perform operations comprising:

receiving, at the processor, a request via a social network website to utilize an intermediary device to establish a wireless hotspot for access to a private computing network, wherein the intermediary device has access to the private computing network via a network device and is associated with a user account of a first user at the social network website and wherein the processor is connected to the intermediary device via the private computing network and the network device;

transmitting, by the processor, a command to the intermediary device via the private computing network to establish the wireless hotspot in response to receiving the request via the social network website;

receiving, at the processor, access information associated with the user account of the first user via the social network website from a computing device associated with the first user, the access information specifying groups of user accounts associated with the social network website and their corresponding levels of access to the private computing network via the wireless hotspot;

receiving, at the processor, identification information via the social network website from a mobile computing device of a second user, the identification information indicative of a user account of the second user;

determining, at the processor, a level of access to the private computing network via the wireless hotspot for the mobile computing device of the second user based on a particular group to which the user account of the second user belongs, wherein the particular group is one of the groups specified in the access information and wherein the level of access for the mobile computing device of the second user is to be changed in view of associating, based on input received via the social network website, the user account of the second user to a different group of user accounts specified in the access information; and transmitting, from the processor and to the intermediary device, the determined level of access to the private computing network via the wireless hotspot to cause the intermediary device to act as a proxy between the mobile computing device and the network device and grant the mobile computing device the level of access to the private computing network via the wireless hotspot.

3. The computer-implemented method of claim 2, wherein the request is generated by the computing device associated with the first user in response to input by the first user via the social network website displayed at the computing device.

4. The computer-implemented method of claim 2, wherein the level of access associated with the second user is a particular level of access associated with a group of user accounts that includes the user account of the second user.

5. The computer-implemented method of claim 2, further comprising:
   detecting, at the processor, the intermediary device.

6. The computer-implemented method of claim 2, wherein the network device is a router configured with a network key for selectively granting access to the private computing network.

7. The computer-implemented method of claim 2, wherein the intermediary device is a wireless access point comprising a transceiver.

8. The computer-implemented method of claim 7, wherein the wireless access point is a wireless streaming-media device.

9. A server having one or more processors configured to perform operations comprising:

receiving, at a server, a request via a social network website to utilize an intermediary device to establish a wireless hotspot for access to a private computing network, wherein the intermediary device has access to the private computing network via a network device and is associated with a user account of a first user at the social network website and wherein the server is connected to the intermediary device via the private computing network and the network device;

transmitting, by the server, a command to the intermediary device via the private computing network to establish the wireless hotspot in response to receiving the request via the social network website;

receiving, at the server, access information associated with the user account of the first user via the social network website from a computing device associated with the first user, the access information specifying groups of user accounts associated with the social network website and their corresponding levels of access to the private computing network via the wireless hotspot;

receiving, at the server, identification information via the social network website from a mobile computing device of a second user, the identification information indicative of a user account of the second user;

determining, at the server, a level of access to the private computing network via the wireless hotspot for the mobile computing device of the second user based on a particular group to which the user account of the second user belongs, wherein the particular group is one of the groups specified in the access information and wherein the level of access for the mobile computing device of the second user is to be changed in view of associating, based on input received via the social network website, the user account of the second user to a different group of user accounts specified in the access information; and transmitting, from the server and to the intermediary device, the determined level of access to the private computing network via the wireless hotspot to cause the intermediary device to act as a proxy between the mobile computing device and the network device and grant the mobile computing device the level of access to the private computing network via the wireless hotspot.

10. The server of claim 9, wherein the request is generated by the computing device associated with the first user in response to input by the first user via the social network website displayed at the computing device.

11. The server of claim 9, wherein the level of access associated with the second user is a particular level of access associated with a group of user accounts that includes the user account of the second user.

12. The server of claim 9, wherein the operations further comprise:
   detecting the intermediary device.

13. The server of claim 9, wherein the network device is a router configured with a network key for selectively granting access to the private computing network.

14. The server of claim 9, wherein the intermediary device is a wireless streaming-media device comprising a transceiver.

* * * * *